US008731535B2

(12) United States Patent
Goel et al.

(10) Patent No.: US 8,731,535 B2
(45) Date of Patent: May 20, 2014

(54) GROUP COMMUNICATION SESSIONS IN A WIRELESS COMMUNICATIONS SYSTEM

(75) Inventors: Amit Goel, San Diego, CA (US); Mohammed Ataur Rahman Shuman, San Diego, CA (US); Rajan Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 12/832,335

(22) Filed: Jul. 8, 2010

(65) Prior Publication Data

US 2012/0009915 A1 Jan. 12, 2012

(51) Int. Cl.
*H04M 3/00* (2006.01)
*H04W 4/10* (2009.01)

(52) U.S. Cl.
CPC ..................................... *H04W 4/10* (2013.01)
USPC ........... 455/418; 455/417; 455/419; 455/420; 709/224; 709/225; 709/226

(58) Field of Classification Search
CPC ..... H04W 4/10; H04W 76/005; H04W 8/186; H04W 4/025; H04L 29/06442
USPC ............................ 455/417–420; 709/204–207
See application file for complete search history.

(56) References Cited

U.S. PATENT DOCUMENTS

| | | | | |
|---|---|---|---|---|
| 7,580,375 | B1 * | 8/2009 | Friedrich et al. | 370/260 |
| 8,005,497 | B2 * | 8/2011 | Shaffer et al. | 455/518 |
| 8,355,743 | B2 * | 1/2013 | Kim et al. | 455/517 |
| 2002/0123895 | A1 | 9/2002 | Potekhin et al. | |
| 2003/0012149 | A1 * | 1/2003 | Maggenti et al. | 370/260 |
| 2004/0174830 | A1 * | 9/2004 | Koskelainen et al. | 370/260 |
| 2005/0058125 | A1 * | 3/2005 | Mutikainen et al. | 370/354 |
| 2006/0229093 | A1 * | 10/2006 | Bhutiani et al. | 455/518 |
| 2006/0244818 | A1 * | 11/2006 | Majors et al. | 348/14.08 |
| 2009/0054010 | A1 * | 2/2009 | Shaffer et al. | 455/90.2 |
| 2009/0054097 | A1 * | 2/2009 | Kim et al. | 455/518 |
| 2011/0065481 | A1 * | 3/2011 | Patel et al. | 455/566 |
| 2011/0119404 | A1 * | 5/2011 | Maes | 709/249 |

OTHER PUBLICATIONS

International Search Report and Written Opinion—PCT/US2011/038115, ISA/EPO—Sep. 5, 2011.

* cited by examiner

*Primary Examiner* — Fayyaz Alam
(74) *Attorney, Agent, or Firm* — Raphael Freiwirth

(57) ABSTRACT

In an embodiment, an access terminal (AT), requests a non-exclusive floor (NEF) for a group communication session (GCS) in response to a detection that a user of the AT intends to speak to an associated communication group (CG). In another embodiment, the AT later requests that its NEF for the GCS be revoked in response to a detection that the user of the AT no longer intends to speak to the CG. In another embodiment, another AT holds a NEF for the GCS, and a user of the AT decides to revoke the other AT's NEF such that the AT sends a floor-revocation request to an application server (AS) that is arbitrating the GCS. In another embodiment, the AS grants NEFs to multiple ATs, selectively mixes media received from the ATs for transmission to the CG, and selectively revokes NEFs from one or more of the multiple ATs.

12 Claims, 12 Drawing Sheets

GROUP COMMUNICATION SESSIONS IN A WIRELESS COMMUNICATIONS SYSTEM

BACKGROUND OF THE INVENTION

1. Field of the Invention

Embodiments of the present invention are directed to group communication sessions in a wireless communications session.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The 3rd Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

In an embodiment, an access terminal (AT), requests a non-exclusive floor (NEF) for a group communication session (GCS) in response to a detection that a user of the AT intends to speak to an associated communication group (CG). In another embodiment, the AT later requests that its NEF for the GCS be revoked in response to a detection that the user of the AT no longer intends to speak to the CG. In another embodiment, another AT holds a NEF for the GCS, and a user of the AT decides to revoke the other AT's NEF such that the AT sends a floor-revocation request to an application server (AS) that is arbitrating the GCS. In another embodiment, the AS grants NEFs to multiple ATs, selectively mixes media received from the ATs for transmission to the CG, and selectively revokes NEFs from one or more of the multiple ATs.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
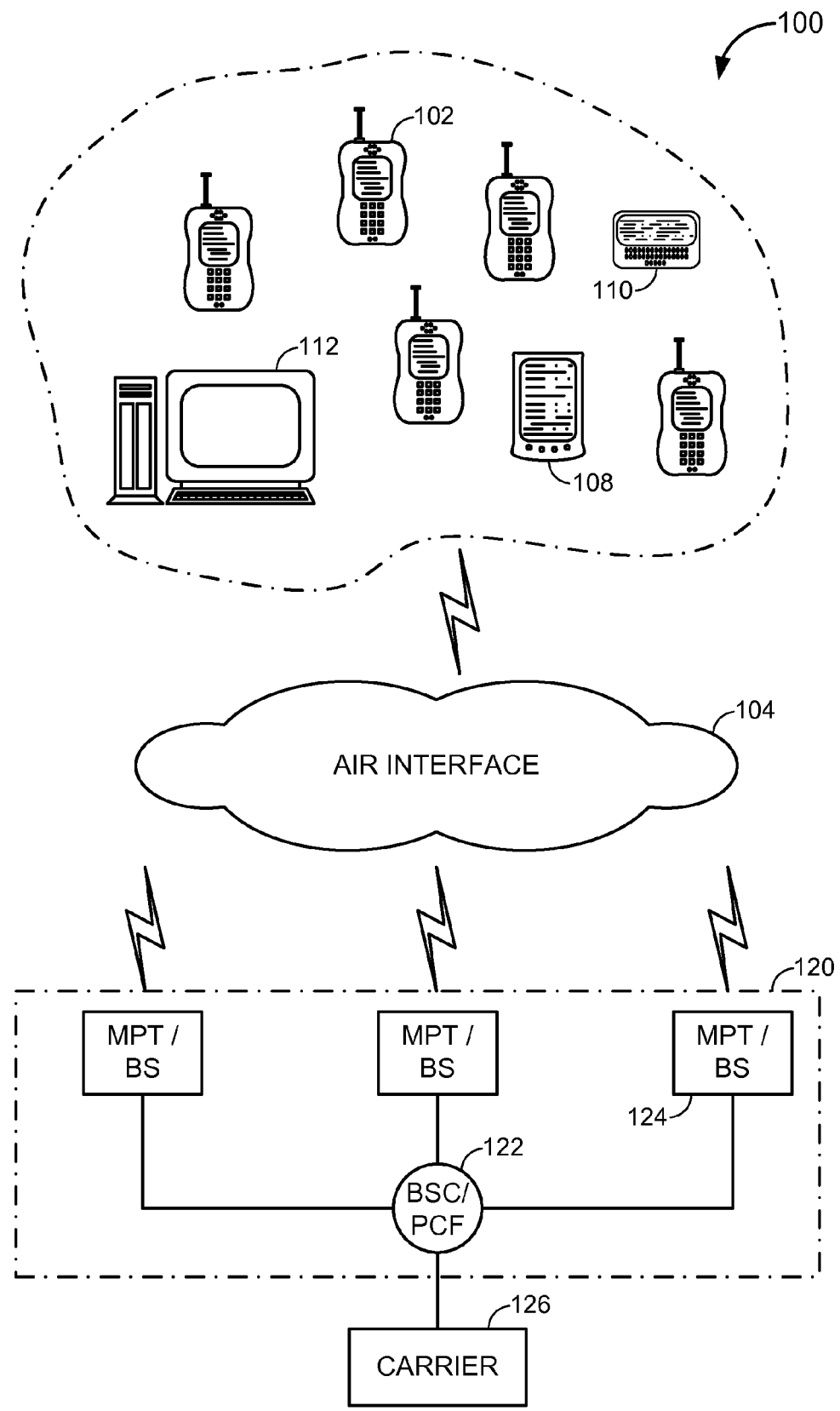
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data-rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 160 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
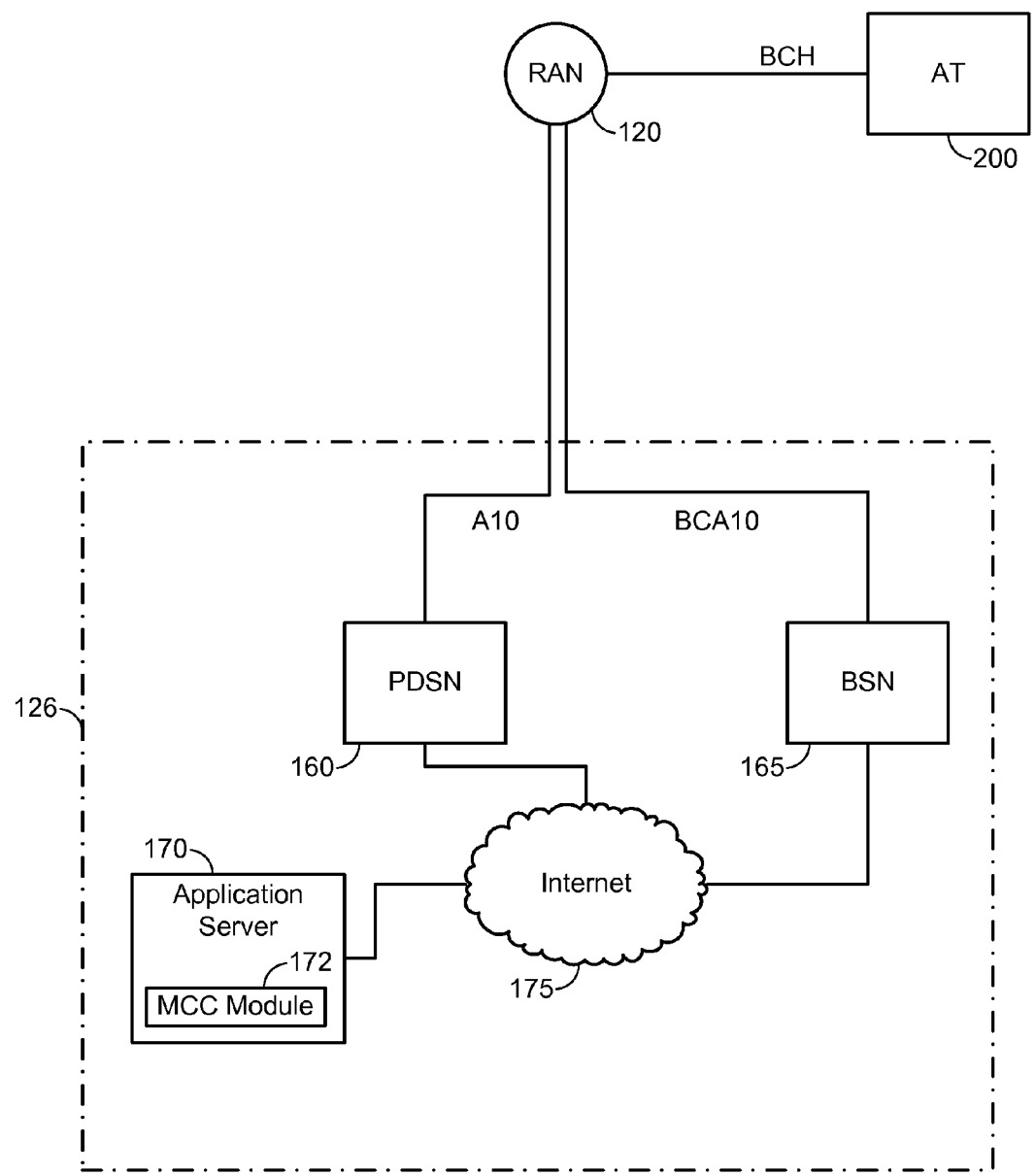
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The application server 170 includes a media content complex (MCC) module 172, the functionality of which will be described below in greater detail. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
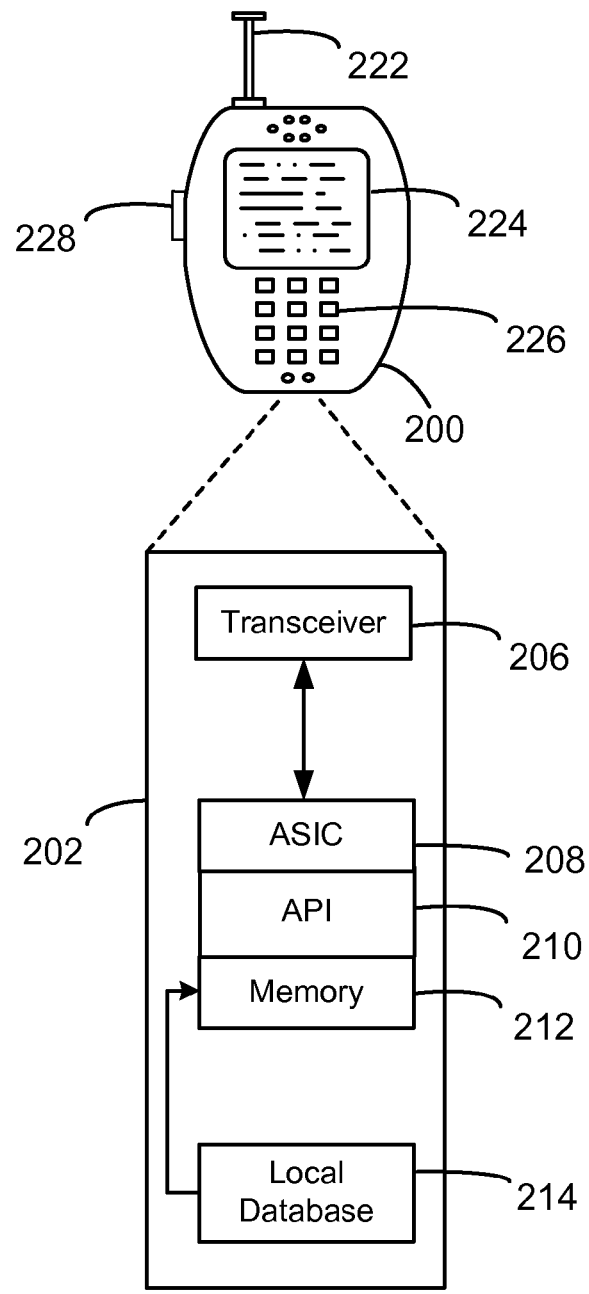
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4A:
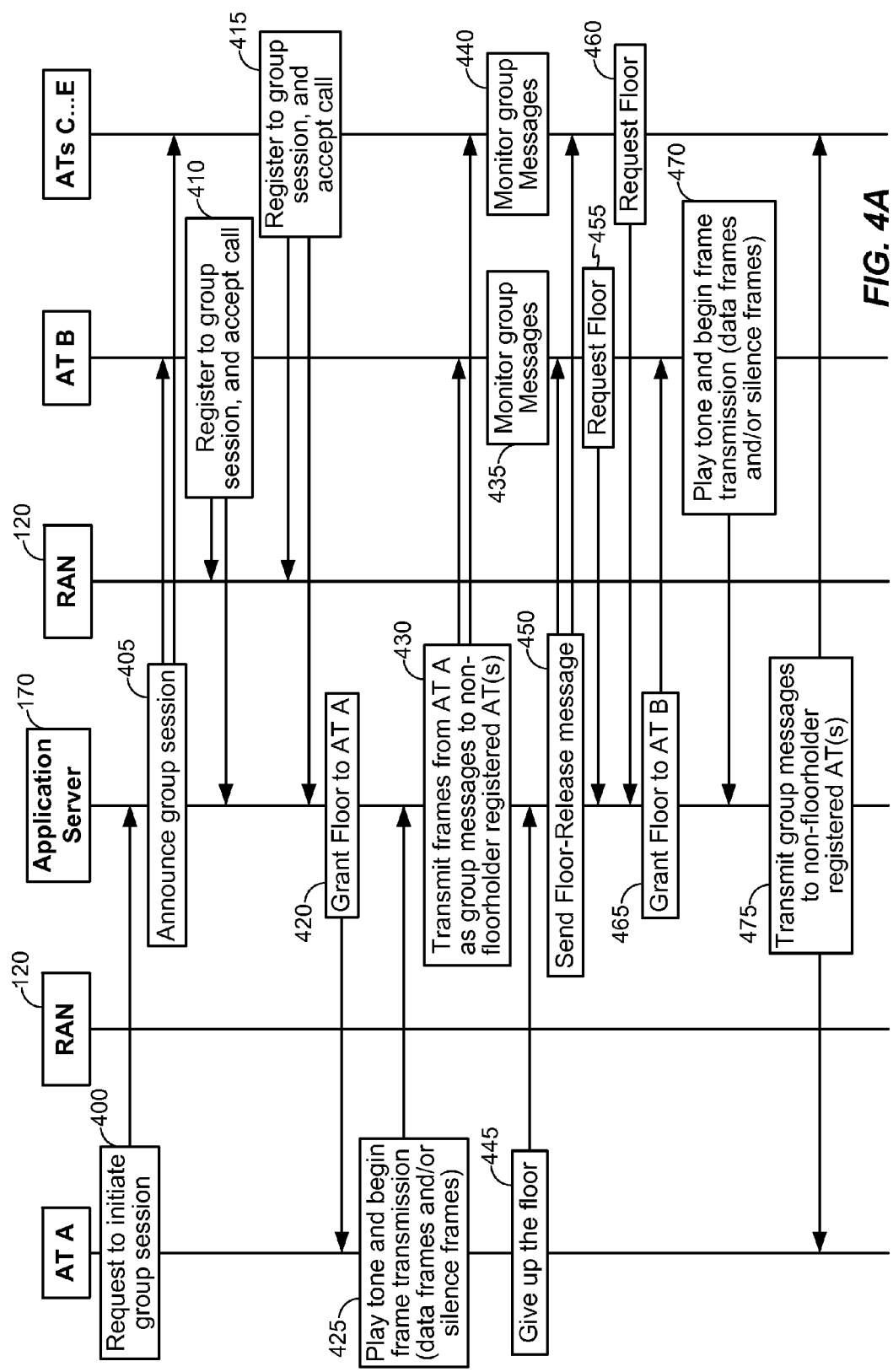
FIG. 4A illustrates a conventional half-duplex group communication session process.

FIG. 4A illustrates a conventional half-duplex group communication session (e.g., a call, a transport session, etc.) process. The group communication session of FIG. 4A may correspond to a group communication session supported by IP multicasting protocols, or IP unicasting protocols. In IP multicasting, a downlink broadcast channel (BCH) carries a single multicast flow within one or more sectors to reach each 'listening' multicast group member, while a separate scheduling message (e.g., a broadcast overhead message (BOM)) is transmitted on a downlink control channel that indicates how the multicast group members can tune to the downlink BCH. In IP unicasting, each group message is transmitted to each group communication session participant, or multicast group member, as a separate unicast message that is addressed to each group member individually.

Referring to FIG. 4A, in 400, a given AT ("AT A") sends a request to the application server 170 via the RAN 120 to initiate a group communication session. For example, the group communication session may correspond to a push-to-talk (PTT) or push-to-transfer (PTX) session, and the transmission of the request in 400 may be prompted based on a user of AT A pressing a PTT or PTX button on AT A. The application server 170 receives the group communication session request from AT A, and transmits an announce message in one or more sectors of the wireless communication system 100, 405. At least ATs B . . . E receive the announce message, and determine to join the announced group communication session. Accordingly, ATs B . . . E send a call accept message to the application server 170, and also send a registration message (e.g., BCMCSFlowRegistration message) to the RAN 120 to register to the group communication session, 410 and 415. The call accept message and registration message from each of ATs B . . . E may either be sent within separate messages on a reverse link access channel, or alternatively may be bundled within the same message.

After receiving a call accept message from a first responder to the announce message from among ATs B . . . E, the application server 170 grants the floor for the group communication session to AT A, 420. Accordingly, after receiving the floor-grant message, AT A plays a tone to indicate to a user of AT A that the user can begin speaking, and AT A begins transmitting frames on a reverse link channel to the application server 170, 425. The series of frame transmissions from 425 can correspond to data frames that actually include voice data, or alternatively can correspond to silence frames that do not actually include voice data.

Each frame transmission can correspond to a real-time transport protocol (RTP) packet or datagram, or alternatively a RTCP (RTP Control Protocol) packet. A header portion of a 40-octet overhead RTP packet may be configured as follows:

TABLE 1

Example of a RTP packet header

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | \multicolumn{8}{c}{Octet 1, 5, 9 . . .} | | | | | | Octet 2, 6, 10 . . . | | | |
| 1-4 | Version | | | | IHL | | | | | | Type of service | | | | | |
| 5-8 | | | | | | | | Identification | | | | | | | | |
| 9-12 | | | | Time to live | | | | | | | Protocol | | | | | |
| 13-16 | | | | | | | | Source address | | | | | | | | |
| 17-20 | | | | | | | | Destination address | | | | | | | | |
| 21-24 | | | | | | | | Source port | | | | | | | | |
| 25-28 | | | | | | | | Length | | | | | | | | |
| 29-32 | V = 2 | | | P | X | CC | | | | M | | | PT | | | |
| 33-36 | | | | | | | | Timestamp | | | | | | | | |
| 37-40 | | | | | | | Synchronization source (SSRC) number | | | | | | | | | |

| | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| | \multicolumn{8}{c}{Octet 3, 7, 11 . . .} | | | | | | Octet 4, 8, 12 . . . | | | |
| 1-4 | | | | | | | | Total length | | | | | | | | |
| 5-8 | Flags | | | | | | | | | | Fragment offset | | | | | |
| 9-12 | | | | | | | | Header checksum | | | | | | | | |
| 13-16 | | | | | | | | Source address | | | | | | | | |
| 17-20 | | | | | | | | Destination address | | | | | | | | |
| 21-24 | | | | | | | | Destination port | | | | | | | | |
| 25-28 | | | | | | | | Checksum | | | | | | | | |
| 29-32 | | | | | | | | Sequence number | | | | | | | | |
| 33-36 | | | | | | | | Timestamp | | | | | | | | |
| 37-40 | | | | | | | Synchronization source (SSRC) number | | | | | | | | | |

Referring to Table 1, the fields of the RTP packet header portion are well-known in the art. However, certain fields are discussed in more detail with respect to embodiments described in more detail below, and as such will be referred to briefly in this section. For example, the contribution count (CC) field, Sequence Number field, Timestamp field and SSRC number field will now be addressed briefly. The CC field is an optional field that can hold a contributing source (CSRC) count value. Although not shown on the header diagram of Table 1 (above), the 12 octet header of the CC field can optionally be expanded to include more contributing sources. Contributing sources can be added by a mixer at the application server 170, and are relevant for conferencing applications where elements of the data payload have originated from different computers. For point-to-point communications, CSRCs are not necessarily required. The Sequence Number field holds a unique reference number which increments by one for each RTP packet sent from a particular source, or AT. The Sequence Number field allows the receiver to reconstruct the sender's packet sequence. The Timestamp field corresponds to the time that the RTP packet was transmitted by the AT. The Timestamp field allows the receiving AT(s) to buffer and playout the data in a continuous stream. The SSRC number field corresponds to a number that identifies the source of the RTP packet, which in 425 identifies AT A. The SSRC number can be provisioned by the application server 170 at the start of the group communication session.

After the RTP header portion, the RTP packet includes a data payload portion. The data payload portion can include digitized samples of voice and/or video. The length of the data payload can vary for different RTP packets. For example, in voice RTP packets, the length of the voice sample carried by the data payload may correspond to 20 milliseconds (ms) of sound. Generally, for longer media durations (e.g., higher-rate frames), the data payload either has to be longer as well, or else the quality of the media sample is reduced.

Returning to 425 of FIG. 4A, the frames transmitted from AT A can correspond to full-rate frames (e.g., 8.6 kpbs) that have a large data payload in the RTP packet, half-rate frames (e.g., 4.3 kpbs) that include a 'medium' data payload in the RTP packet, ⅛th rate frames (e.g., 1.0 kpbs) that include a small data payload in the RTP packet, and so on. While references are generally made to EVRC-A, it will be readily apparent how these embodiments can be modified to accommodate other vocoders that include different frame rate options. As will be appreciated, when a user of AT A is speaking, AT A transmits higher-rate frames than when the user of AT A is not speaking and AT A is transmitting silence frames. The application server 170 includes a media control complex (MCC) 172 module that handles the receipt of a media stream from floor-holders, and the transcoding of an output stream to one or more 'listening' group members to the group communication session. In other words, the MCC module 172 replicates and re-broadcasts the frames within RTP packets from AT A to each of ATs B . . . E. Accordingly, a series of frame transmissions from AT A that are received at the MCC module 172 of the application server 170 may be represented as follows:

TABLE 2

| Media Frames arriving at the MCC from AT A at 't' interval for Half-Duplex | | | | | | | | | |
|---|---|---|---|---|---|---|---|---|---|
| 10t | 9t | 8t | 7t | 6t | 5t | 4t | 3t | 2t | T |

| | 10t | 9t | 8t | 7t | 6t | 5t | 4t | 3t | 2t | T |
|---|---|---|---|---|---|---|---|---|---|---|
| A | ■½ | ■½ | □⅛ | □⅛ | ■½ | ■½ | □⅛ | ■½ | □⅛ | ■½ |
| B | — | — | — | — | — | — | — | — | — | — |
| C | — | — | — | — | — | — | — | — | — | — |
| D | — | — | — | — | — | — | — | — | — | — |
| E | — | — | — | — | — | — | — | — | — | — | wherein time intervals 10t . . . T each include one frame (e.g., RTP packet) having a given data-rate from AT A. It may be assumed that the ■½ frames correspond to data frames (e.g., including voice data), whereas the □⅛ correspond to silence frames. However, it is appreciated that it is at least possible for a ■½ frame to include a limited amount of noise, similar to a silence frame. Also, because FIG. 4A is a half-duplex group communication session, it is noted that Table 2 (above) indicates that AT A is transmitting frames (e.g., within one or more RTP packets), whereas ATs B . . . E are not transmitting any packets. The frames (e.g., RTP packets) illustrated in Table 2 correspond to an input stream of packets or frames that are received at the application server 170.

As noted above, the MCC module 172 receives the input stream as illustrated above in Table 2, and generates or transcodes an output stream that is transmitted to ATs B . . . E. Accordingly, based on Table 2, the output stream generated by the MCC module 172 of the application server 170 may be configured as follows.

TABLE 3

Media Frames in the output stream from the MCC to ATs B ... E for Half-Duplex

| | 10t | 9t | 8t | 7t | 6t | 5t | 4t | 3t | 2t | T |
|---|---|---|---|---|---|---|---|---|---|---|
| A | — | — | — | — | — | — | — | — | — | — |
| B | ■ ½ | ■ ½ | ☐ ⅛ | ☐ ⅛ | ■ ½ | ■ ½ | ☐ ⅛ | ■ ½ | ☐ ⅛ | ■ ½ |
| C | ■ ½ | ■ ½ | ☐ ⅛ | ☐ ⅛ | ■ ½ | ■ ½ | ☐ ⅛ | ■ ½ | ☐ ⅛ | ■ ½ |
| D | ■ ½ | ■ ½ | ☐ ⅛ | ☐ ⅛ | ■ ½ | ■ ½ | ☐ ⅛ | ■ ½ | ☐ ⅛ | ■ ½ |
| E | ■ ½ | ■ ½ | ☐ ⅛ | ☐ ⅛ | ■ ½ | ■ ½ | ☐ ⅛ | ■ ½ | ☐ ⅛ | ■ ½ |

As shown in Table 3 (above), the output stream is configured such that AT A's frame transmissions are not transmitted back to AT A, but are rather transmitted to ATs B ... E in Table 2, above.

As the output stream is generated by the MCC module 172, the application server 170 transmits RTP packets including output frames from the output stream to ATs B ... E, 430, as a series of group messages, and ATs B ... E monitor the group messages for the group communication session, 435 and 440. The group communication session then continues for a period of time, until a user of AT A determines to give up the floor, 445. 445 can correspond to an explicit instruction from AT A to give up the floor, or based on a period of inactivity from AT A.

After determining AT A has given up the floor to the group communication session, the application server 170 sends a floor-release message to ATs B ... E, 450. Assume that a user of AT B and at least one of ATs C ... E determine to attempt to gain control of the floor, and send floor request messages to the application server 170, 455 and 460. The application server 170 thereby receives multiple floor request messages, and evaluates priority levels of the ATs requesting the floor to determine the AT that will next be granted the floor. For example, based on the type of group communication session, the application server 170 may evaluate one or more priority tables maintained at the RAN 120, and may grant the floor to a highest-priority AT from among the ATs requesting the floor. For example, the priority tables may be configured as follows:

TABLE 4

Priority Tables to Evaluate Floor Requests

| Direct Calls | | Adhoc Calls | | Closed Group Calls | | Closed Chat room Calls | |
|---|---|---|---|---|---|---|---|
| User | Priority | User | Priority | User | Priority | User | Priority |
| A | 7 | A | 7 | A | 2 | A | 2 |
| B | 7 | B | 7 | B | 5 | B | 5 |
| C | 7 | C | 7 | C | 7 | C | 7 |
| D | 7 | D | 7 | D | 1 | D | 1 |
| E | 7 | E | 7 | E | 3 | E | 3 |

In 465, assume that the application server 170 determines AT B has the highest priority level from among the requesting AT for the call-type of the group communication session, and the application server 170 sends a floor-grant message to AT B. Next, AT B plays a tone to notify a user of AT B that AT B now has the floor, and AT B begins transmitting frames (e.g., data frames, silence frames, etc.) within one or more RTP packets to the application server 170, 470, which are then converted into an output stream by the MCC module 172 and re-transmitted to ATs A and C ... E, 475. It will be appreciated that 470 and 475 are performed in the same manner as 425 and 430 as described above with respect to AT A, and as such 470 and 475 will not be described further for the sake of brevity.

As is characteristic of a half-duplex session, certain ATs in the group communication session of FIG. 4A only transmit frames (e.g., within RTP packets), while other ATs in the group communication session only receive frames (e.g., within RTP packets). An alternative to the process of FIG. 4A is a full-duplex group communication session, which is described below with respect to FIG. 4B. In a full-duplex session, each participant to the session can both transmit and receive frames (e.g., within RTP packets).

Figure 4B:
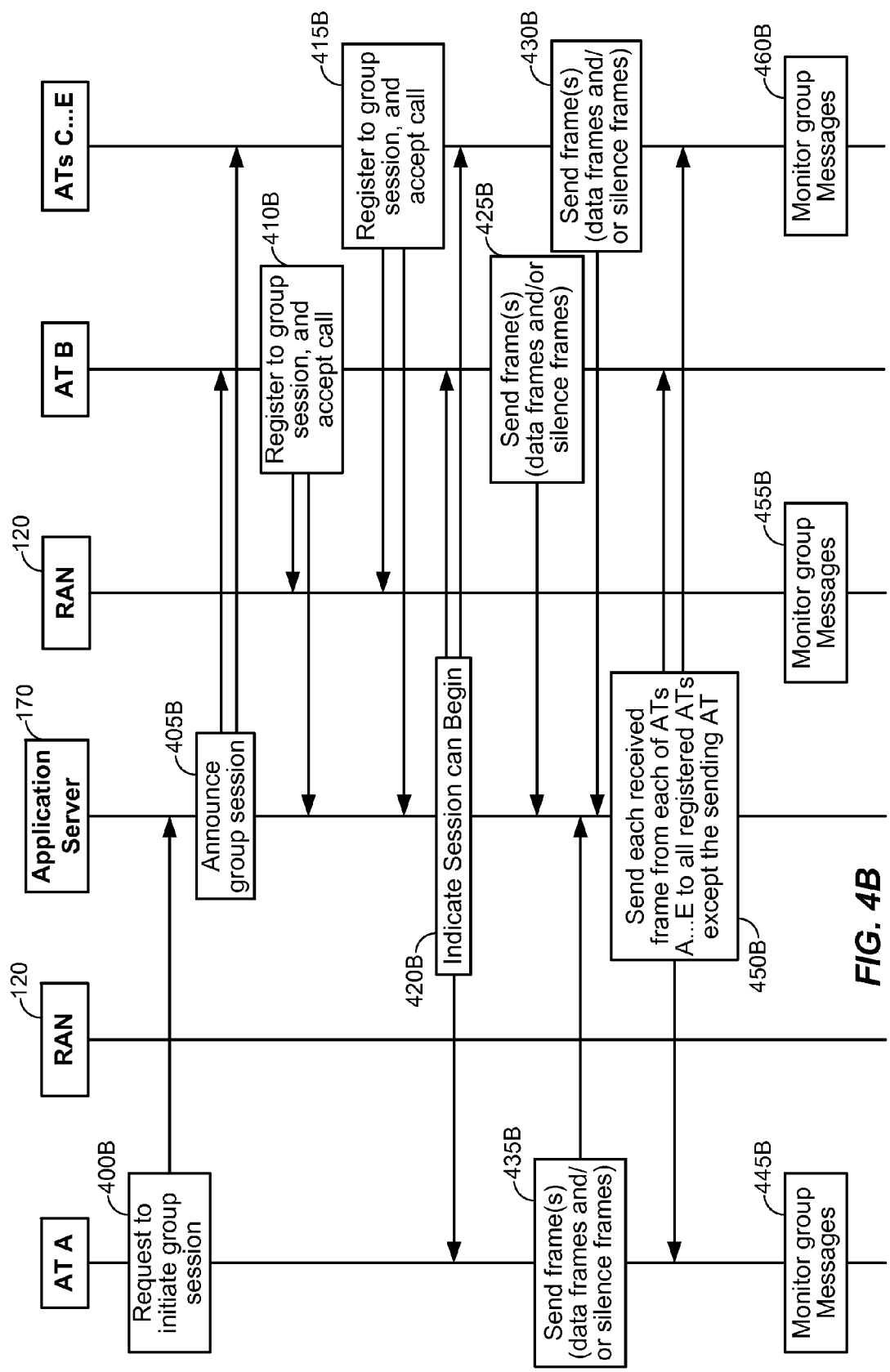
FIG. 4B illustrates a conventional full-duplex group communication session process.

FIG. 4B illustrates a conventional full-duplex group communication session (e.g., a call, a data transport session, etc.) process. As in FIG. 4A, the group communication session of FIG. 4B may correspond to a group communication session supported by IP multicasting protocols, or IP unicasting protocols. Referring to FIG. 4B, 400B through 415B correspond to 400 through 415 of FIG. 4A, and as such will not be discussed further for the sake of brevity.

In 420B, instead of granting the floor to the session initiator (i.e., AT A), the application server 170 sends a message to each AT that has joined the group communication session indicating that the session can begin, 420B. Upon receiving the message 420B, any of ATs A ... E can begin speaking and thereby send data frames, or else can remain silent and send silence frames, 425B, 430B, 435B.

An example of the input stream from ATs A ... E (e.g., the frames included within RTP packets from ATs A ... E for particular timeslots) that are received at the MCC module 172 of the application server 170 may be represented as follows:

TABLE 5

Media Frames arriving at the MCC from ATs A ... E at 't' interval for Full-Duplex

| | 10t | 9t | 8t | 7t | 6t | 5t | 4t | 3t | 2t | T |
|---|---|---|---|---|---|---|---|---|---|---|
| A | ■ ½ | ■ ½ | ■ ½ | ■ ½ | ■ ½ | ■ ½ | ■ ½ | ■ ½ | ■ ½ | ■ ½ |
| B | ☐ ⅛ | ☐ ⅛ | ☐ ⅛ | ☐ ⅛ | ☐ ⅛ | ☐ ⅛ | ☐ ⅛ | ☐ ⅛ | ☐ ⅛ | ☐ ⅛ |
| C | ☐ ⅛ | ☐ ⅛ | ☐ ⅛ | ☐ ⅛ | ☐ ⅛ | ☐ ⅛ | ☐ ⅛ | ☐ ⅛ | ☐ ⅛ | ☐ ⅛ |
| D | ☐ ⅛ | ☐ ⅛ | ☐ ⅛ | ☐ ⅛ | ☐ ⅛ | ☐ ⅛ | ☐ ⅛ | ☐ ⅛ | ☐ ⅛ | ☐ ⅛ |
| E | ☐ ⅛ | ☐ ⅛ | ☐ ⅛ | ☐ ⅛ | ☐ ⅛ | ☐ ⅛ | ☐ ⅛ | ☐ ⅛ | ☐ ⅛ | ☐ ⅛ |

Referring to Table 5 (above), each of ATs A . . . E is transmitting frames over timeslots 10t . . . T at a given data rate. In particular, AT A is sending a series of half-rate frames (e.g., which indicates that a user of AT A is likely speaking to ATs B . . . E, and sending voice data), while ATs B . . . E are sending a series of ⅛th rate frames (e.g., which indicates that the users of ATs B . . . E are likely listening to AT A, have walked away from their phones, etc.).

in Table 5 (above), and then generates or transcodes output streams that are transmitted to ATs A . . . E (e.g., which are each different because each output stream omits the frames of the input stream received from the target in order to reduce feedback). Accordingly, based on Table 5 (above), the output stream generated by the MCC module 172 of the application server 170 over timeslots 10t . . . T may be configured as follows:

TABLE 6

Media Frames in the output streams from the MCC to ATs A . . . E for Full-Duplex

|   | 10t | 9t | 8t | 7t | 6t | 5t | 4t | 3t | 2t | T |
|---|---|---|---|---|---|---|---|---|---|---|
| A | ☐⅛ (B) | ☐⅛ (B) | ☐⅛ (B) | ☐⅛ (B) | ☐⅛ (B) | ☐⅛ (B) | ☐⅛ (B) | ☐⅛ (B) | ☐⅛ (B) | ☐⅛ (B) |
|   | ☐⅛ (C) | ☐⅛ (C) | ☐⅛ (C) | ☐⅛ (C) | ☐⅛ (C) | ☐⅛ (C) | ☐⅛ (C) | ☐⅛ (C) | ☐⅛ (C) | ☐⅛ (C) |
|   | ☐⅛ (D) | ☐⅛ (D) | ☐⅛ (D) | ☐⅛ (D) | ☐⅛ (D) | ☐⅛ (D) | ☐⅛ (D) | ☐⅛ (D) | ☐⅛ (D) | ☐⅛ (D) |
|   | ☐⅛ (E) | ☐⅛ (E) | ☐⅛ (E) | ☐⅛ (E) | ☐⅛ (E) | ☐⅛ (E) | ☐⅛ (E) | ☐⅛ (E) | ☐⅛ (E) | ☐⅛ (E) |
| B | ■½ (A) | ■½ (A) | ■½ (A) | ■½ (A) | ■½ (A) | ■½ (A) | ■½ (A) | ■½ (A) | ■½ (A) | ■½ (A) |
|   | ☐⅛ (C) | ☐⅛ (C) | ☐⅛ (C) | ☐⅛ (C) | ☐⅛ (C) | ☐⅛ (C) | ☐⅛ (C) | ☐⅛ (C) | ☐⅛ (C) | ☐⅛ (C) |
|   | ☐⅛ (D) | ☐⅛ (D) | ☐⅛ (D) | ☐⅛ (D) | ☐⅛ (D) | ☐⅛ (D) | ☐⅛ (D) | ☐⅛ (D) | ☐⅛ (D) | ☐⅛ (D) |
|   | ☐⅛ (E) | ☐⅛ (E) | ☐⅛ (E) | ☐⅛ (E) | ☐⅛ (E) | ☐⅛ (E) | ☐⅛ (E) | ☐⅛ (E) | ☐⅛ (E) | ☐⅛ (E) |
| C | ■½ (A) | ■½ (A) | ■½ (A) | ■½ (A) | ■½ (A) | ■½ (A) | ■½ (A) | ■½ (A) | ■½ (A) | ■½ (A) |
|   | ☐⅛ (B) | ☐⅛ (B) | ☐⅛ (B) | ☐⅛ (B) | ☐⅛ (B) | ☐⅛ (B) | ☐⅛ (B) | ☐⅛ (B) | ☐⅛ (B) | ☐⅛ (B) |
|   | ☐⅛ (D) | ☐⅛ (D) | ☐⅛ (D) | ☐⅛ (D) | ☐⅛ (D) | ☐⅛ (D) | ☐⅛ (D) | ☐⅛ (D) | ☐⅛ (D) | ☐⅛ (D) |
|   | ☐⅛ (E) | ☐⅛ (E) | ☐⅛ (E) | ☐⅛ (E) | ☐⅛ (E) | ☐⅛ (E) | ☐⅛ (E) | ☐⅛ (E) | ☐⅛ (E) | ☐⅛ (E) |
| D | ■½ (A) | ■½ (A) | ■½ (A) | ■½ (A) | ■½ (A) | ■½ (A) | ■½ (A) | ■½ (A) | ■½ (A) | ■½ (A) |
|   | ☐⅛ (B) | ☐⅛ (B) | ☐⅛ (B) | ☐⅛ (B) | ☐⅛ (B) | ☐⅛ (B) | ☐⅛ (B) | ☐⅛ (B) | ☐⅛ (B) | ☐⅛ (B) |
|   | ☐⅛ (C) | ☐⅛ (C) | ☐⅛ (C) | ☐⅛ (C) | ☐⅛ (C) | ☐⅛ (C) | ☐⅛ (C) | ☐⅛ (C) | ☐⅛ (C) | ☐⅛ (C) |
|   | ☐⅛ (E) | ☐⅛ (E) | ☐⅛ (E) | ☐⅛ (E) | ☐⅛ (E) | ☐⅛ (E) | ☐⅛ (E) | ☐⅛ (E) | ☐⅛ (E) | ☐⅛ (E) |
| E | ■½ (A) | ■½ (A) | ■½ (A) | ■½ (A) | ■½ (A) | ■½ (A) | ■½ (A) | ■½ (A) | ■½ (A) | ■½ (A) |
|   | ☐⅛ (B) | ☐⅛ (B) | ☐⅛ (B) | ☐⅛ (B) | ☐⅛ (B) | ☐⅛ (B) | ☐⅛ (B) | ☐⅛ (B) | ☐⅛ (B) | ☐⅛ (B) |
|   | ☐⅛ (C) | ☐⅛ (C) | ☐⅛ (C) | ☐⅛ (C) | ☐⅛ (C) | ☐⅛ (C) | ☐⅛ (C) | ☐⅛ (C) | ☐⅛ (C) | ☐⅛ (C) |
|   | ☐⅛ (D) | ☐⅛ (D) | ☐⅛ (D) | ☐⅛ (D) | ☐⅛ (D) | ☐⅛ (D) | ☐⅛ (D) | ☐⅛ (D) | ☐⅛ (D) | ☐⅛ (D) |

Returning to FIG. 4B, in 440B, the MCC module 172 of the application server 170 includes each of the frames from the input streams at each time interval t, de-jitters the aggregated media stream, and then generates an output stream that includes all the media content from each of ATs A . . . E for that time interval. The application server 170 then sends the resultant media stream to each of ATs A . . . E as a series of aggregated frames within one or more RTP packets. However, it is appreciated that each of ATs A . . . E receives an aggregated media stream containing frames from all session participants, except itself, to avoid feedback problems. Thus, AT A receives an output stream composed of aggregated media from ATs B . . . E, AT B receives an output stream composed of aggregated media from ATs A and C . . . E, and so on.

As noted above, the MCC module 172 receives the frames from ATs A . . . E (i.e., the input stream) as illustrated above As shown in Table 6 (above), due to a simplistic brute force forwarding implementation of the group communication session, the aggregated media frames to ATs A . . . E at each timeslot of the output stream has a total data-rate equal to the sum of the data-rates for frames (e.g., or RTP packets) from ATs other than itself.

With respect to the conventional half-duplex implementation for the group communication session in FIG. 4A, it will be appreciated that bandwidth utilization is superior as compared to the full-duplex implementation for the group communication session of FIG. 4A. However, the inability of ATs to transmit to the group can, at times, be problematic (e.g., if a current floor-holder does not give up the floor and keeps on talking about irrelevant issues). In half-duplex, the current floor-holder would be oblivious to the sentiment of the group because the floor-holder cannot receive feedback from the other group-members until the floor is released.

This problem does not occur in the full-duplex implementation of FIG. 4B. However, the bandwidth requirements of a full-duplex implementation are high, because for N group communication session participants, each participant receives an aggregated output stream having N−1 combined media flows, which consumes a relatively high amount of bandwidth. Also, aggregating a high number of media frames to form the media frames of the output stream can be processing intensive at the application server 170. Also, the MCC module 172 of the application server 170 does not distinguish between media flows. Thus, silence frames are granted the same priority as data frames in the output stream when the frames contend for the same timeslot in the output stream.

Accordingly, embodiments which will now be described in more detail are directed to a hybrid implementation that includes certain properties of both half-duplex and full-duplex implementations. As will be described below in more detail, each of a plurality of participants to a group communication session can be temporarily granted the 'floor', or permission to speak to the group, based on a recognition of which participants have currently expressed an intention to speak to the group. As used herein, granting the 'floor' to a particular AT means that the particular AT has a non-exclusive permission to speak to the group, whereby one or more other ATs can also potentially have permission to speak to the group. Accordingly, references to floor-grants below will be understood to correspond to non-exclusive floor-grants or granting a non-exclusive floor. By contrast, conventional half-duplex sessions typically permit only one floorholder at a time, so the floor in conventional half-duplex sessions can be said to correspond to an exclusive floor.

Figure 5A:
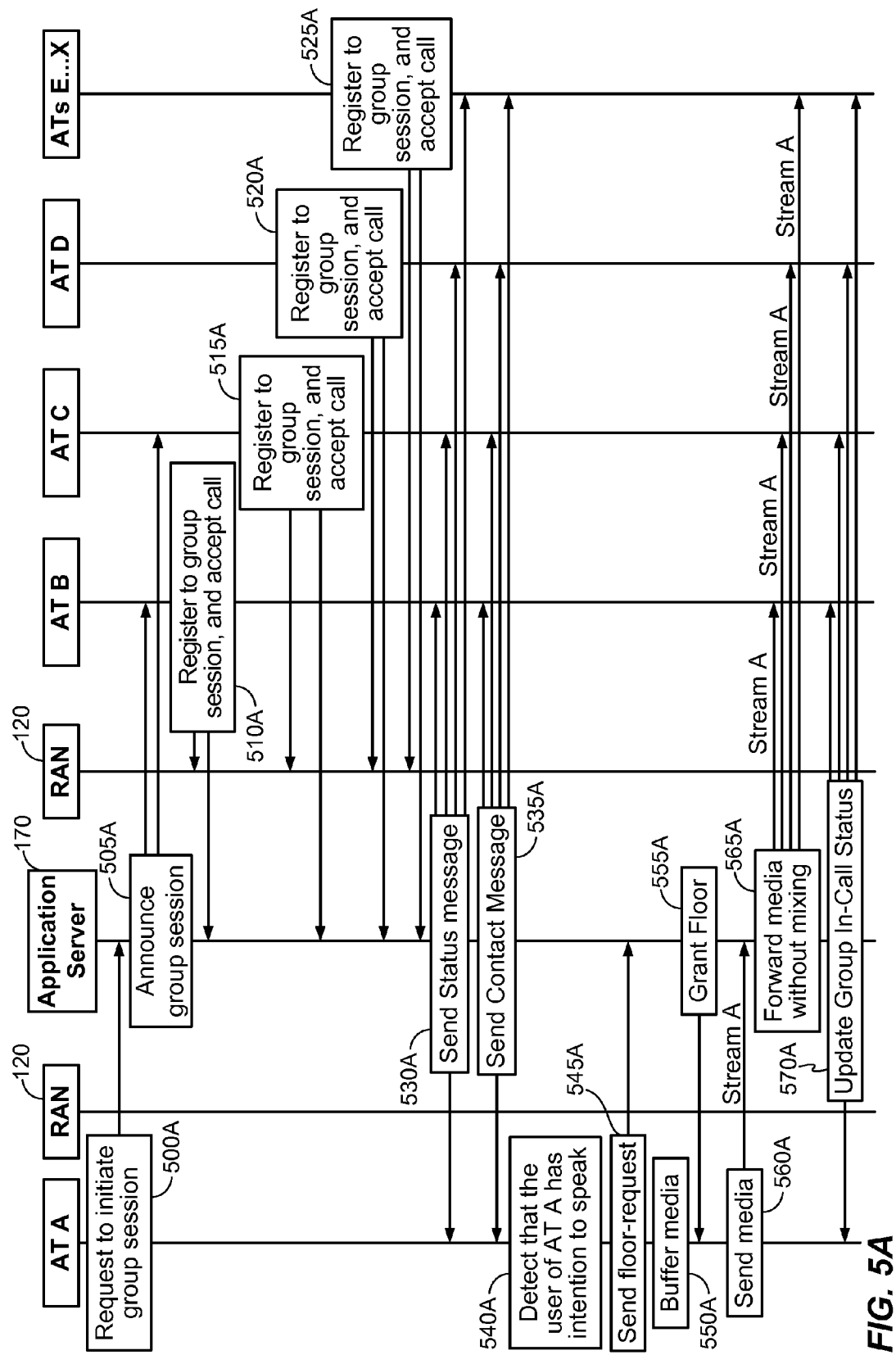
FIG. 5A illustrates a group communication procedure in accordance with in embodiment of the invention.

FIG. 5A illustrates a group communication procedure in accordance with in embodiment of the invention. Referring to FIG. 5A, in 500A, a given AT ("AT A") requests initiation of a group communication session with ATs B . . . X to be arbitrated by the application server 170. In an example, the group communication session can correspond to a voice-over-IP (VoIP) session, a Push-to-Talk (PTT) session or a Push-to-Transfer (PTX) session. The application server 170 receives the session initiation request and announces the group communication session to ATs B . . . X, 505A. Next, assume that each of ATs B . . . X receive the announce message for the group communication session in their respective sector, and further that each of ATs B . . . X decide to accept the announced session and thereby register to the group communication session within their respective sector and provide an indication of call-acceptance to the application server 170, 510A, 515A, 520A and 525A.

After at least one of the call acceptance messages is received from ATs B . . . X at the application server 170, the application server 170 sets up the group communication session by sending status and contact messages to each AT that has accepted the group communication session, 530A and 535A. For example, the status message contains information regarding which group session participants have joined the group communication session. In another example, the contact message contains information regarding how ATs A . . . X can contact the MCC that is handling the exchange of media between the respective ATs during the group communication session.

At this point, assume that AT A detects that its user has performed a given type of user behavior that is indicative of a desire to speak to the group during the group communication session, 540A. In an example, the detection of 540A can correspond to a detection that the user of AT A has started to speak. In another example, the detection of 540A can be more explicit, such as a user of AT A pressing a CALL or PTT button on AT A that is interpreted as a request to speak to the group.

In response to the detection of 540A, AT A transmits a floor-request to the RAN 120, which is forwarded to the application server 170, 545A. Also, while AT A waits to receive the floor for the group communication session, AT A buffers media (e.g., speech) from the user of AT A, 550A. The application server 170 receives the floor-request from AT A and sends a floor-grant message to AT A, 555A. Upon receiving the floor-grant message, AT A begins sending media (e.g., audio), including the media buffered in 550A, to the application server 170 for transmission to the remaining group session participants (i.e., ATs B . . . X), 560A. Hereinafter, the stream of media frames from AT A that are sent from AT A to the application server 170 for re-transmission to ATs B . . . X will be referred to as input stream A.

While not shown explicitly in FIG. 5A, blocks 540A through 550A can be omitted in at least one alternative embodiment of the invention. In this case, AT A's request to initiate or originate the group communication session functions as an implicit indication to the application server 170 that the user of AT A wants to speak to the group. Thus, in this alternative embodiment, the application server 170 can send the floor-grant message of 555A to AT A after sending the status and contact messages in 530A and 535A. As will be appreciated, in a scenario where the originator is automatically allocated the floor during session set-up, this floor could still be revoked if certain conditions are satisfied, as described below with respect to FIGS. 6A-6C.

The application server 170 receives input stream A from AT A and forwards media contained in input stream A from AT A to ATs B . . . X within an output stream, 565A. As will be appreciated, no other group session participants are sending media to the group at this point, such that the output stream contains media only from AT A in 565A. Also, the application server 170 need not send the media contained in input stream A back to AT A, such that no output stream is sent back to AT A in 565A. In 570A, the application server 170 sends a group in-call status update message to each group session participant to notify the respective participants with regard to which ATs are currently speaking to the group. In this case, the group in-call status message of 570A informs ATs A . . . X that AT A is currently transmitting media to the group.

Figure 5B:
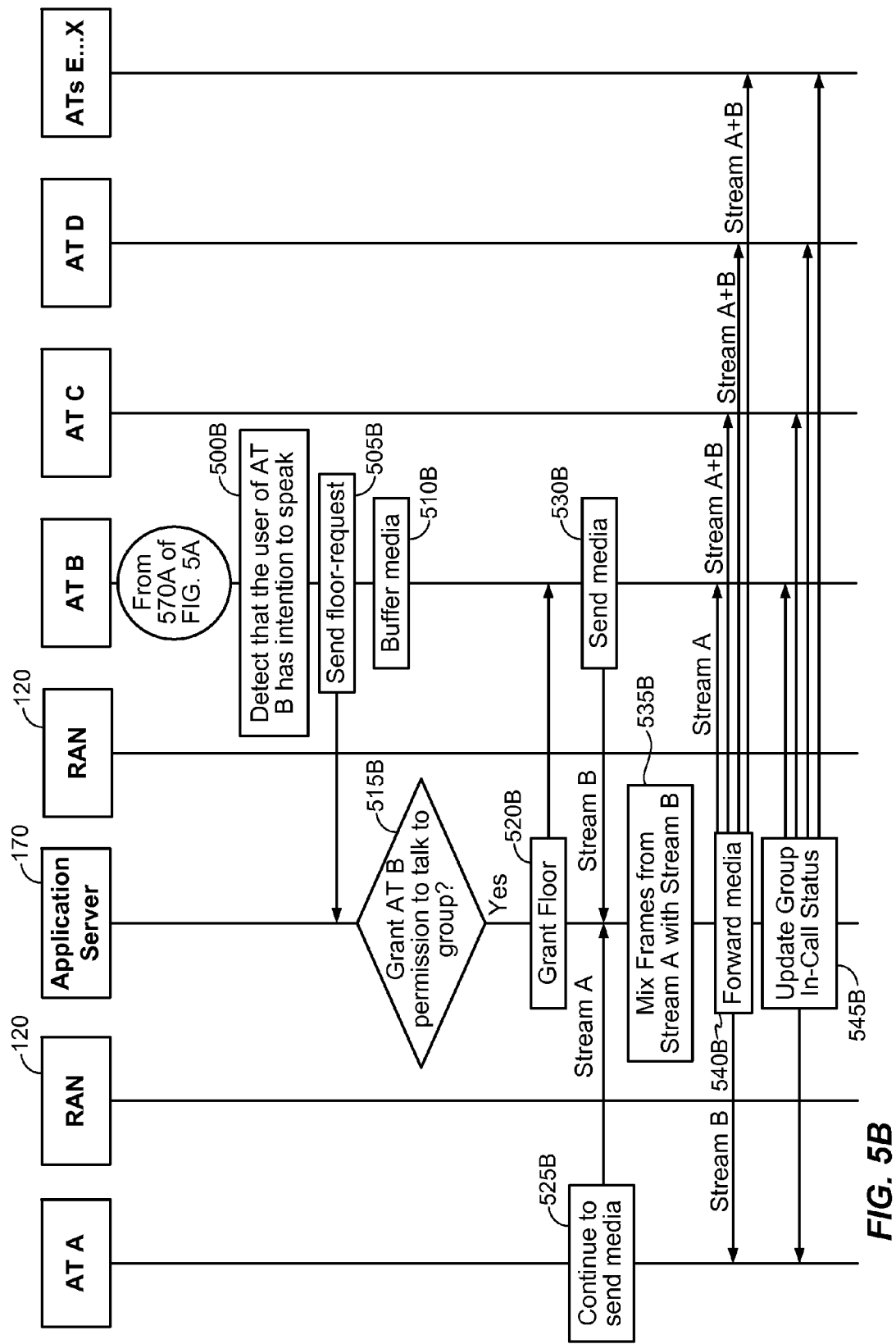
FIG. 5B illustrates a continuation of the process of FIG. 5B in accordance with an embodiment of the invention.

FIG. 5B illustrates a continuation of the process of FIG. 5B in accordance with an embodiment of the invention. Referring to FIG. 5B, after 570A of FIG. 5A, at some point during the group communication session while AT A is sending media to the group, assume that AT B detects that its user has performed a given type of user behavior that is indicative of a desire to speak to the group during the group communication session, 500B. Similar to 540A of FIG. 5A, the detection of 500B can correspond to a detection that the user of AT B has started to speak and/or that the user of AT B has pressed a CALL or PTT button on AT B that is interpreted as a request to speak to the group.

In response to the detection of 500B, AT B transmits a floor-request to the RAN 120, which is forwarded to the application server 170, 505B. Also, while AT B waits to receive a non-exclusive floor for the group communication session, AT B buffers media (e.g., speech) from the user of AT B, 510B. The application server 170 receives the floor-request from AT B and determines whether to grant the non-exclusive floor to AT B, 515B. In an example, the determination of 515B can be based on whether a threshold number of ATs have already been granted a non-exclusive floor for the group communication session. In this embodiment, if the threshold number of ATs have already been granted the non-exclusive floor, then AT B's request will be denied. Alternatively, if the threshold number of ATs have already been granted the non-exclusive floor and AT B has a high-priority, then another lower-priority AT that has the floor can have its floor revoked, after which the revoked floor can be transferred to AT B. In the embodiment of FIG. 5B, it may be assumed that the threshold number of ATs that can concurrently hold the floor, and thereby speak to the group at the same time, is at least equal to two (2). Accordingly, the application server 170 determines to grant AT B the floor by which AT B can speak to the group in 515B.

Thus, the application server 170 sends a floor-grant message to AT B, 520B. During this process of setting-up the floor at AT B, AT A also holds the floor to the hybrid group communication session and continues to send media to the application server 170, as input stream A, for transmission to the group, 525B. Upon receiving the floor-grant message, AT B begins sending media (e.g., audio), including the media buffered in 510B, to the application server 170 for transmission to the remaining group session participants (i.e., ATs A and C . . . X), 530B. Hereinafter, the stream of media frames from AT B that are sent from AT B to the application server 170 for re-transmission to ATs A and C . . . X will be referred to as input stream B.

The application server 170 receives input streams A and B from ATs A and B, respectively, and selectively mixes the individual frames from the respective input streams to form the output stream that will be transmitted to the group, 535B. Specifically, the output stream that is generated for transmission to ATs C . . . X corresponds to a series of mixed media frames that each include a mixed combination of the media from input streams A and B. However, because transmitting ATs do not receive their own media in the output stream that is fed back to the transmitting ATs from the application server 170, it will be appreciated that the output stream that is generated for transmission to AT A corresponds to input stream B and that the output stream that is generated for transmission to AT B corresponds to input stream A. Accordingly, in 540B, the application server 170 forwards the output streams to ATs A . . . X such that AT A receives an output stream containing media from input stream B (e.g., output stream B), AT B receives an output stream containing media from input stream A (e.g., output stream A) and ATs C . . . X each receive an output stream containing media from input streams A and B (e.g., output stream A+B). Examples of mixing media frames of different group session participants are provided in more detail within co-pending U.S. Provisional Application No. 61/224,797, entitled "MEDIA FORWARDING FOR A GROUP COMMUNICATION SESSION IN A WIRELESS COMMUNICATIONS SYSTEM", filed on Jul. 10, 2009, by Ashu Razdan, Arul Ananthanarayanan and Devang Bhatt, assigned to the assignee of the subject application, having attorney docket no. 081935 and hereby incorporated by reference in its entirety.

In 545B, the application server 170 sends a group in-call status update message to each group session participant to notify the respective participants with regard to which ATs are currently speaking to the group. In this case, the group in-call status message of 545B informs ATs A . . . X that ATs A and B are currently transmitting media to the group.

Figure 5C:
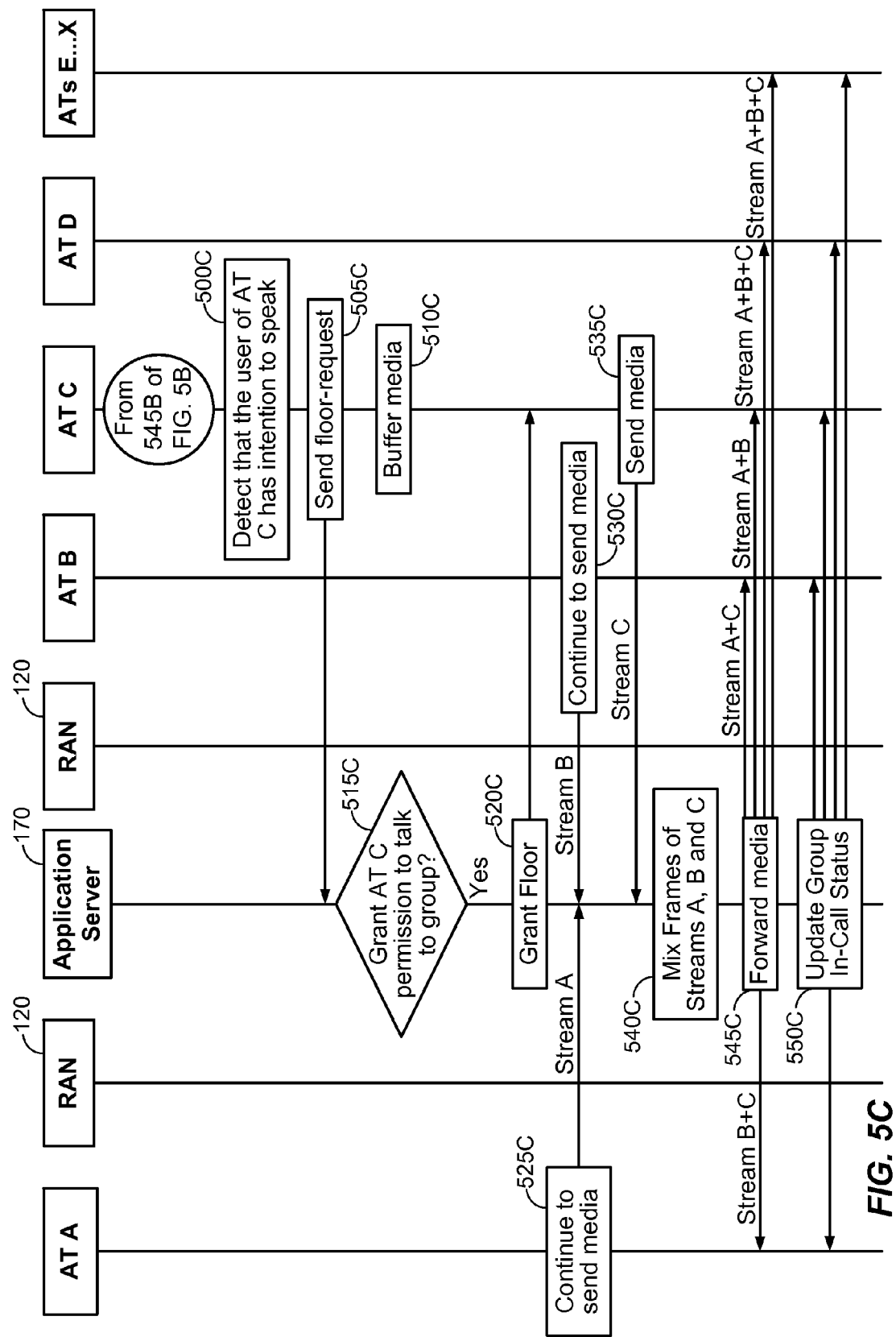
FIG. 5C illustrates a continuation of the process of FIG. 5B in accordance with an embodiment of the invention.

FIG. 5C illustrates a continuation of the process of FIG. 5B in accordance with an embodiment of the invention. Also, while yet to be addressed, FIG. 5C could also constitute a continuation of the process of any of FIGS. 6A through 6C, in the sense that FIG. 5C represents an example whereby a group communication session is already established between ATs A . . . X with ATs A and B currently holding the floor and speaking to the group.

Referring to FIG. 5C, after 545B of FIG. 5B (or after any of FIG. 6A, 6B or 6C), at some point during the group communication session while ATs A and B are each sending media to the group, assume that AT C detects that its user has performed a given type of user behavior that is indicative of a desire to speak to the group during the group communication session, 500C. Similar to 540A of FIGS. 5A and 500B of FIG. 5B, the detection of 500C can correspond to a detection that the user of AT C has started to speak and/or that the user of AT C has explicitly requested to speak to the group (e.g., by pressing a CALL or PTT button on AT C).

In response to the detection of 500C, AT C transmits a floor-request to the RAN 120, which is forwarded to the application server 170, 505C. Also, while AT C waits to receive the floor for the group communication session, AT C buffers media (e.g., speech) from the user of AT C, 510C. The application server 170 receives the floor-request from AT C and determines whether to grant a non-exclusive floor to AT C, 515C. In an example, as discussed above with respect to 515B of FIG. 5B, the determination of 515C can be based on whether a threshold number of ATs have already been granted the floor for the group communication session. In this embodiment, if the threshold number of ATs have already been granted non-exclusive floors, then AT C's request will be denied. Alternatively, if the threshold number of ATs have already been granted the floor and AT C has a high-priority, then another lower-priority AT that has the floor can have its floor revoked, after which the revoked floor can be transferred to AT C. In the embodiment of FIG. 5C, it may be assumed that the threshold number of ATs that can concurrently hold the floor, and thereby speak to the group at the same time, is at least equal to three (3). Accordingly, the application server 170 determines to grant AT C the floor by which AT C can speak to the group in 515C.

Thus, the application server 170 sends a floor-grant message to AT C, 520C. During this process of setting-up the floor at AT C, ATs A and B also hold the floor to the hybrid group communication session and continue to send media to the application server 170, as input streams A and B, respectively, for transmission to the group, 525C and 530C. Upon receiving the floor-grant message, AT C begins sending media (e.g., audio), including the media buffered in 510C, to the application server 170 for transmission to the remaining group session participants (i.e., ATs A, B and D . . . X), 535C. Hereinafter, the stream of media frames from AT C that are sent from AT C to the application server 170 for re-transmission to ATs A, B and D . . . X will be referred to as input stream C.

The application server 170 receives input streams A, B and C from ATs A, B and C, respectively, and selectively mixes the individual frames from the respective input streams to form the output stream that will be transmitted to the group, 540C. Specifically, the output stream that is generated for transmission to ATs D . . . X corresponds to a series of mixed media frames that each include a mixed combination of the media from input streams A, B and C. However, because transmitting ATs do not receive media in the output stream from the application server 170 that was provided from their own respective input stream, it will be appreciated that the output stream that is generated for transmission to AT A corresponds to a mixed combination of the media from input streams B and C, that the output stream that is generated for transmission to AT B corresponds to a mixed combination of the media from input streams A and C, and that the output stream that is generated for transmission to AT C corresponds to a mixed combination of the media from input streams A and B.

Accordingly, in 545C, the application server 170 forwards the output streams to ATs A . . . X such that AT A receives an output stream containing media from input streams B and C (e.g., output stream B+C), AT B receives an output stream containing media from input streams A and C (e.g., output stream A+C), AT C receives an output stream containing media from input streams A and B (e.g., output stream A+B), and ATs D . . . X each receive an output stream containing media from input streams A, B and C (e.g., output stream A+B+C). In 550C, the application server 170 sends a group in-call status update message to each group session participant to notify the respective participants with regard to which ATs are currently speaking to the group. In this case, the group in-call status message of 550C informs ATs A . . . X that ATs A, B and C are currently transmitting media to the group.

Figure 5D:
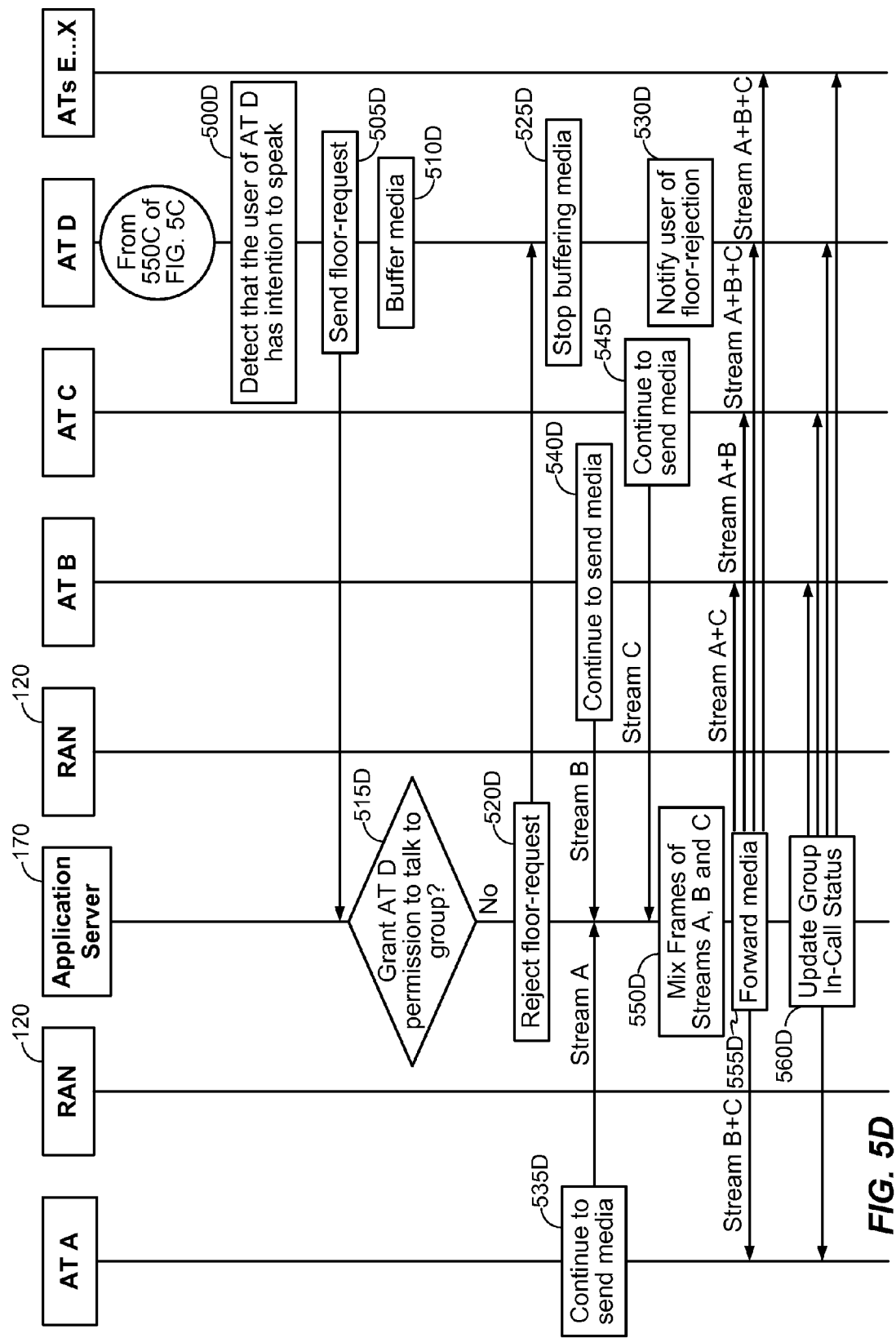
FIG. 5D illustrates a continuation of the process of FIG. 5C in accordance with an embodiment of the invention.

FIG. 5D illustrates a continuation of the process of FIG. 5C in accordance with an embodiment of the invention, such that FIG. 5D represents an example whereby a group communication session is already established between ATs A . . . X with ATs A, B and C currently holding the floor and speaking to the group.

Referring to FIG. 5D, after 550C of FIG. 5C, at some point during the group communication session while ATs A, B and C are each sending media to the group, assume that AT D detects that its user has performed a given type of user behavior that is indicative of a desire to speak to the group during the group communication session, 500D. Similar to 540A of FIG. 5A, 500B of FIG. 5B and/or 500C of FIG. 5C, the detection of 500D can correspond to a detection that the user of AT D has started to speak and/or that the user of AT D has explicitly requested to speak to the group (e.g., by pressing a CALL or PTT button on AT D).

In response to the detection of 500D, AT D transmits a floor-request to the RAN 120, which is forwarded to the application server 170, 505D. Also, while AT D waits to receive the floor for the group communication session, AT D buffers media (e.g., speech) from the user of AT C, 510D. The application server 170 receives the floor-request from AT D and determines whether to grant the floor to AT D, 515D. In an example, as discussed above with respect to 515B of FIG. 5B and/or 515C of FIG. 5C, the determination of 515D can be based on whether a threshold number of ATs have already been granted non-exclusive floors for the group communication session. In this embodiment, if the threshold number of ATs have already been granted non-exclusive floors, then AT D's request will be denied. Alternatively, if the threshold number of ATs have already been granted the floor and AT D has a high-priority, then another lower-priority AT that has the floor can have its floor revoked, after which the floor can be transferred to AT D.

In the embodiment of FIG. 5D, it may be assumed that the application server 170 determines to reject the floor-request from AT D in 515D (e.g., because the threshold number of floor-holders for the group communication session has been reached or for some other reason). Thus, the application server 170 sends a floor-reject message to AT D, 520D. AT D receives the floor-reject message and stops buffering media, 525D (e.g., because AT D was rejected permission to send the media to the group at this time). AT D can also optionally notify its user with regard to the floor-rejection (e.g., so that the user of AT D can stop speaking under the assumption that his/her media will be sent out to the group), for example, by outputting an audio or visual alert, 530D.

During this process of attempting to set-up but ultimately rejecting the floor for AT D, ATs A, B and C still hold the floor to the hybrid group communication session and continue to send media to the application server 170, as input streams A, B and C, respectively, for transmission to the group, 535D, 540D and 545D. The remaining of FIG. 5D substantially corresponds to portions of FIG. 5C, and as such will not be described further for the sake of brevity. In particular, 550D through 560D of FIG. 5D substantially correspond to 540C through 550C, respectively, of FIG. 5C.

As will be appreciated by one of ordinary skill in the art, the process of FIG. 5D is an example whereby a group session participant is not permitted to speak to the group during the group communication session, and is restricted to receiving the media from the participants that have received permission to speak to the group (i.e., the floor). In embodiments that will be described below with respect to FIGS. 6A through 6C, an AT that was previously granted the floor can have its floor revoked. The floor-revocation can be initiated by the AT itself (e.g., as in FIG. 6A), by a high-priority AT or 'superuser' (e.g., as in FIG. 6B) or upon the initiative of the application server 170 (e.g., as in FIG. 6C).

Figure 6A:
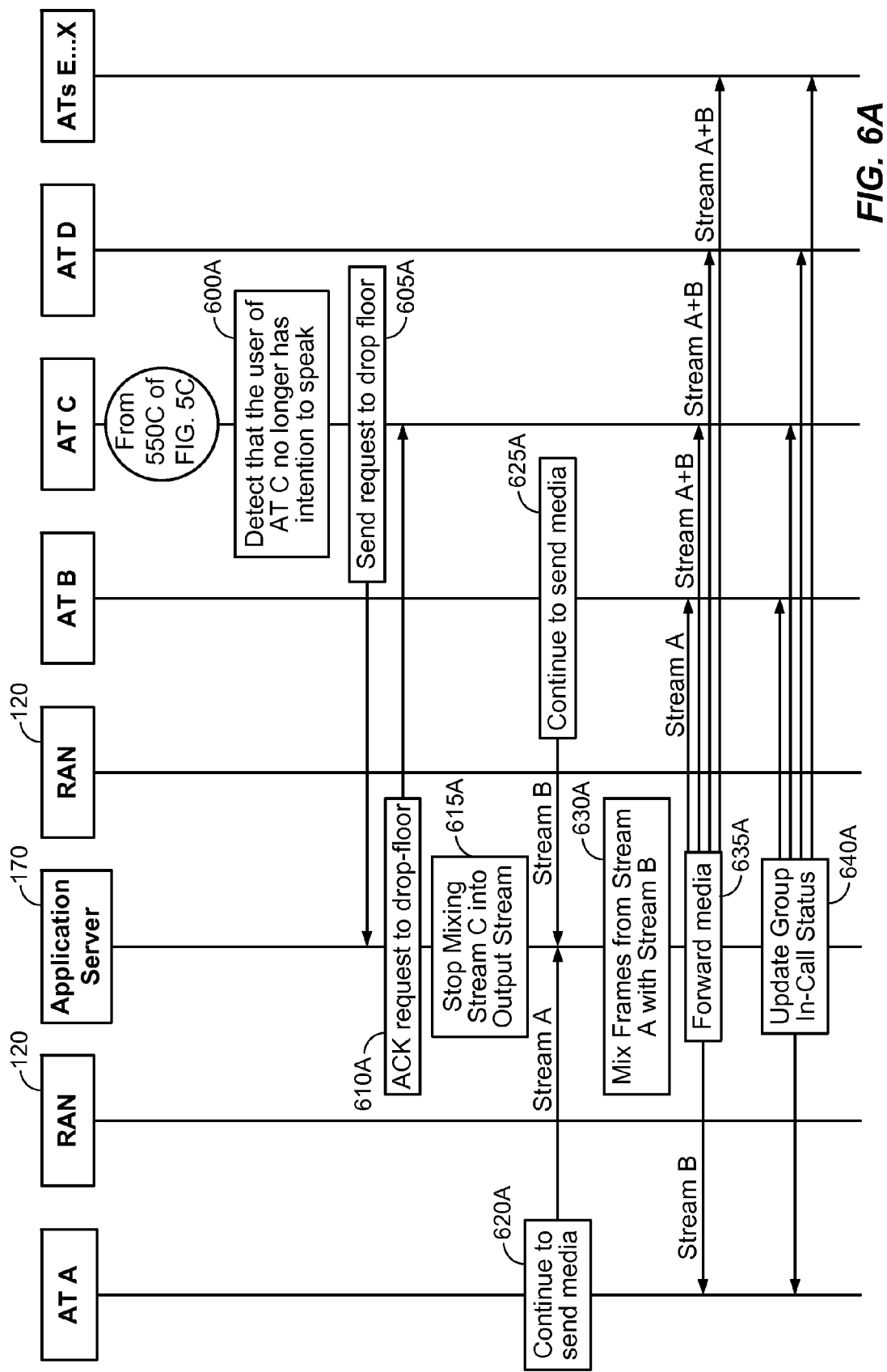
FIG. 6A illustrates an example of floor revocation in accordance with an embodiment of the invention.

Accordingly, FIG. 6A illustrates an example of floor revocation in accordance with an embodiment of the invention. In particular, FIG. 6A illustrates an example whereby ATs A . . . X are already engaged in a group communication session with ATs A, B and C each holding a non-exclusive floor and speaking to the group. Thus, FIG. 6A can be considered to be a continuation of the process of FIG. 5C, because FIG. 5C establishes a group communication session with similar conditions.

Referring to FIG. 6A, after 550C of FIG. 5C, at some point during the group communication session while ATs A, B and C are each sending media to the group, assume that AT C detects that its user has performed a given type of user behavior that is indicative of the user no longer having a desire to speak to the group during the group communication session, 600A. In an example, the detection of 600A can correspond to a cessation of the user behavior that caused the detection of 500C of FIG. 5C. For example, if AT C detected that its user had the intention to speak to the group based on the user beginning to speak into AT C at 500C, then the detection that the user no longer has the intention to speak to the group in 600A can correspond to when the user stops speaking. Alternatively, the detection of 600A can correspond to a separate or supplemental action by the user that functions to explicitly indicate the user's intention to stop speaking to the group. For example, if AT C detected that its user had the intention to speak to the group based on the user pressing CALL or PTT button on AT C, then the detection that the user no longer has the intention to speak to the group in 600A can correspond to when the user presses another button on AT C (e.g., a second press of the CALL or PTT button, a press of an END or cancel button, a detection of voice-inactivity for a threshold period of time, etc.). As will be appreciated, any of the above-noted 'buttons' can correspond to 'physical' tactile-response type-buttons, or to 'soft' buttons (e.g., touch-screen type buttons, menu selections, etc.).

In response to the detection of 600A, AT C transmits a request to revoke (drop or release) its non-exclusive floor to the RAN 120, which is forwarded to the application server 170, 605A. While not shown within FIG. 6A, AT C can optionally cease transmission of media to the application server 170 for transmission to the group even before the application server 170 acknowledges that AT C's floor has been revoked (i.e., dropped or released). The application server 170 receives the request to revoke the non-exclusive floor from AT C, drops AT C's non-exclusive floor and then acknowledges that AT C's floor has been revoked, 610A. At this point, the application server 170 stops mixing media from input stream C into any of the output streams to ATs A ... X, 615A. While not shown in FIG. 6A, AT C can also optionally notify its user with regard to the floor-revocation (e.g., so that the user of AT C is aware that his/her speech is no longer being sent to the group).

After revoking AT C's non-exclusive floor to the group communication session, it will be appreciated that ATs A and B still hold non-exclusive floors to the hybrid group communication session and continue to send media to the application server 170, as input streams A and B, respectively, for transmission to the group, 620A and 625A. The remaining of FIG. 6A substantially corresponds to portions of FIG. 5B, and as such will not be described further for the sake of brevity. In particular, 630A through 640A of FIG. 6A substantially correspond to 535B through 545B, respectively, of FIG. 5C.

Figure 6B:
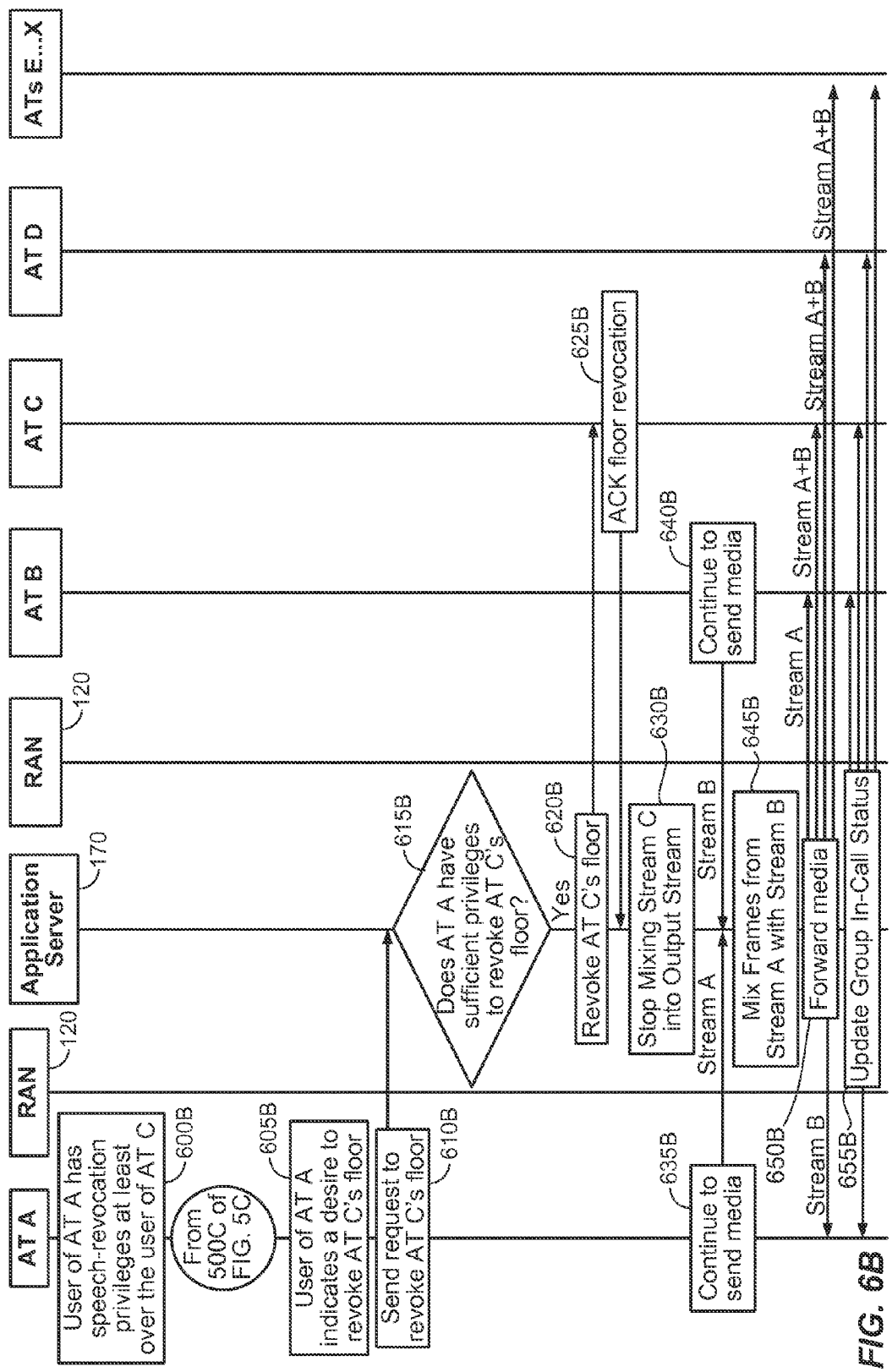
FIG. 6B illustrates another example of floor revocation in accordance with an embodiment of the invention.

FIG. 6B illustrates another example of floor revocation in accordance with an embodiment of the invention. In particular, while FIG. 6A illustrates an example of floor-revocation for AT C initiated by AT C itself, FIG. 6B illustrates an example whereby AT C's floor revocation is initiated by another AT (i.e., AT A). Similar to FIG. 6A, FIG. 6B illustrates an example whereby ATs A ... X are already engaged in a group communication session with ATs A, B and C each holding a non-exclusive floor and speaking to the group. Thus, FIG. 6B can be considered to be a continuation of the process of FIG. 5C, because FIG. 5C establishes a group communication session with similar conditions.

Referring to FIG. 6B, assume that AT A is a high-priority user or superuser, 600B. In the embodiment of FIG. 6B, being a 'superuser' or high-priority user means that AT A has revocation privileges for one or more other group session participants. In an example, the priorities of ATs for revocation privileges can be similar to the manner in which the application server 170 is configured to evaluate contending floor-requests as noted above. For example, the 'superuser' authorities can be established as follows, whereby each AT can revoke non-exclusive floors for any AT having a lower priority:

TABLE 7

Priority Tables to Evaluate Floor Revocation Requests

| Direct Calls | | Adhoc Calls | | Closed Group Calls | | Closed Chat room Calls | |
|---|---|---|---|---|---|---|---|
| User | Priority | User | Priority | User | Priority | User | Priority |
| A | 9 | A | 9 | A | 9 | A | 9 |
| B | 7 | B | 7 | B | 5 | B | 5 |
| C | 7 | C | 7 | C | 7 | C | 7 |
| D | 7 | D | 7 | D | 1 | D | 1 |
| E...X | 7 | E...X | 7 | E...X | 3 | E...X | 3 |

As shown in Table 7, AT A is the highest-priority user for each type of call (i.e., priority level=9) and thereby has permission to revoke the floor for any AT. AT B can revoke the floor for ATs D ... X if the group communication session is a closed group call or a closed chat room call, and so on. As will be appreciated, this simply represents one manner in which a given group session participant can achieve revocation privileges or revocation authority with respect to one or more other participants of the group communication session.

Turning back to FIG. 6B, after 550C of FIG. 5C, at some point during the group communication session while ATs A, B and C are each sending media to the group, assume that AT A determines that its user desires to revoke AT C's floor, 605B. As will be appreciated, the user of AT A can determine to revoke AT C's floor for any of a number of reasons. For example, the user of AT C may be very loud and distracting to the user of AT A, the user of AT A may have something important to say and does not want to be interrupted by the user of AT C, and so on. While AT A in the embodiment of FIG. 6B is a current holder of a non-exclusive floor to the group communication session, it will be appreciated that other embodiments can be directed to scenarios where a non-floorholder or 'listener' to the session is a superuser. In this case, it will be appreciated that the user that invokes his/her revocation authority over another user, such that the other user is forced to give up his/her non-exclusive floor, need not him/herself currently have a non-exclusive floor to the session. The determination of 605B can be based on input by the user of AT A into AT A.

Responsive to the determination of 605B, AT A transmits a request to revoke the non-exclusive floor of AT C to the RAN 120, which forwards the request to the application server 170, 610B. The application server 170 receives the request to revoke the non-exclusive floor from AT C, and determines whether AT A has sufficient privileges to revoke the floor of AT C, 615B. In this example, it is assumed that AT A has sufficient revocation privileges to revoke the floor of AT C. As such, the application server 170 drops AT C's non-exclusive floor and then notifies that AT C that its floor has been revoked, 620B. AT C acknowledges the floor-revocation message in 625B. While not shown in FIG. 6B, AT C can also optionally notify its user with regard to the floor-revocation (e.g., so that the user of AT C is aware that his/her speech is no longer being sent to the group).

Figure 6C:
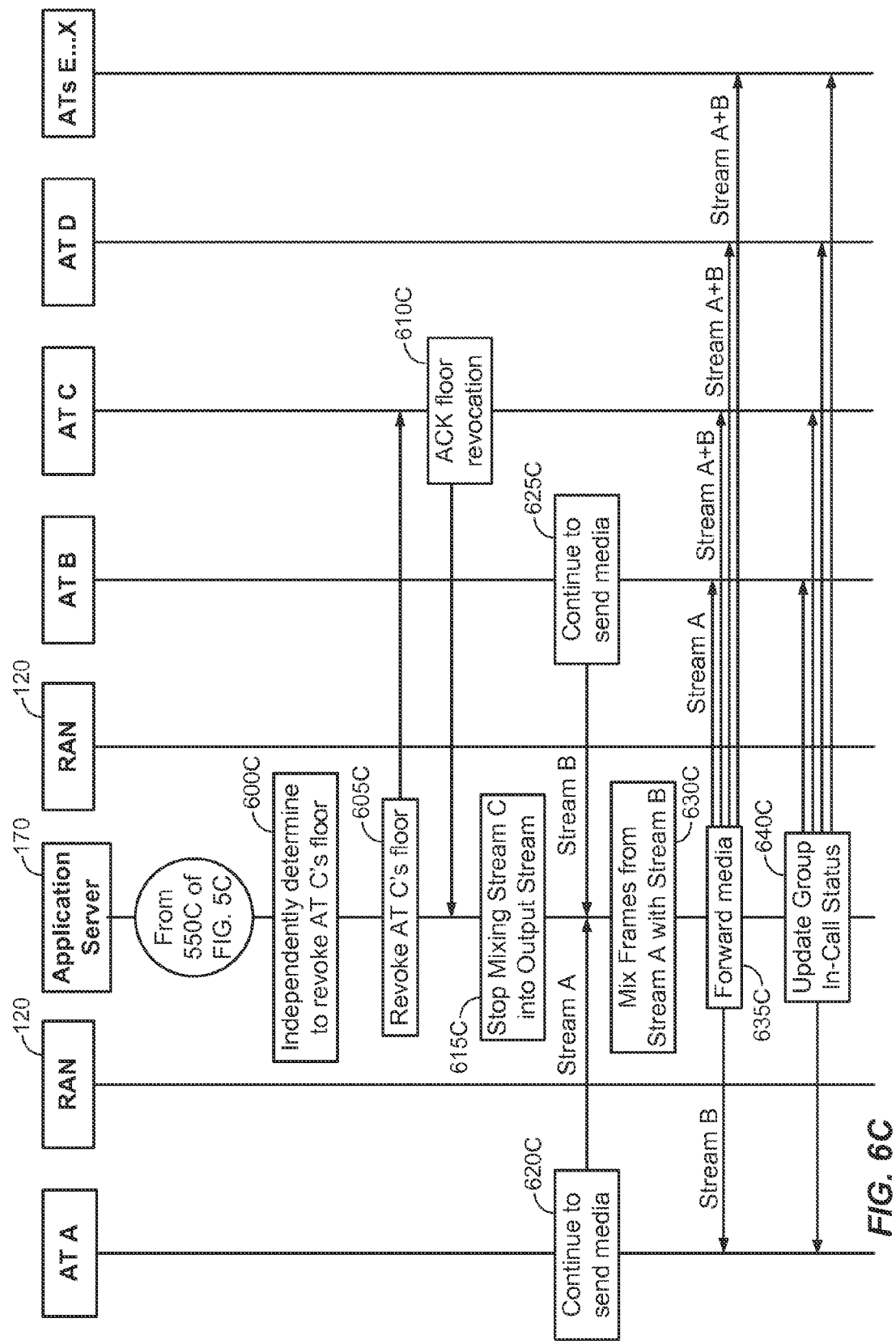
FIG. 6C illustrates another example of floor revocation in accordance with another embodiment of the invention.

At this point, the application server 170 stops mixing media from input stream C into any of the output streams to ATs A ... X, 630B. After revoking AT C's non-exclusive floor to the group communication session, it will be appreciated that ATs A and B still hold non-exclusive floors to the hybrid group communication session and continue to send media to the application server 170, as input streams A and B, respectively, for transmission to the group, 635B and 640B. Next, 645B through 655B substantially correspond to 630A through 640A of FIG. 6A, respectively, and as such will not be described further for the sake of brevity FIG. 6C illustrates another example of floor revocation in accordance with an embodiment of the invention. In particular, while FIG. 6A illustrates an example of floor-revocation for AT C initiated by AT C itself and FIG. 6B illustrates an example of floor-revocation initiated by another AT, FIG. 6C illustrates an example whereby the decision to revoke AT C's floor originates at the application server 170. Similar to FIGS. 6A and 6B, FIG. 6C illustrates an example whereby ATs A ... X are already engaged in a group communication session with ATs A, B and C each holding a non-exclusive floor and speaking to the group. Thus, FIG. 6C can be considered to be a continuation of the process of FIG. 5C, because FIG. 5C establishes a group communication session with similar conditions.

Referring to FIG. 6C, after 550C of FIG. 5C, at some point during the group communication session while ATs A, B and C are each sending media to the group, assume that the application server 170 determines to revoke AT C's floor, 600C. As will be appreciated, the application server 170 A can determine to revoke AT C's floor for any of a number of reasons. For example, assume that the threshold or maximum number of non-exclusive floor-holders is three, such that ATs A, B and C are monopolizing the floor-access. Next, a floor-request arrives from a user with a higher-priority than AT C. In this case, the application server 170 can revoke AT C's floor so that the floor can be allocated to the higher-priority user. In another example, the application server 170 can track how long the floor has been allocated to AT C and can revoke AT C's floor when the timer expires. It will be appreciated that there are many other reasons that can cause the application server 170 to reach the decision to revoke AT C's floor in 600C. Also, the time limit for floor-allocation can be omitted entirely in certain embodiments, such as when the group communication session corresponds to a lecture where the lecturer would be expected to hold the floor for most if not all of the session. In another example, the application server 170 can detect undesirable audio patterns (e.g., such as white-noise, loud honking horns in a traffic jam, emergency sirens, intentional jamming sound from a malicious user, etc., which is not good for mixed audio), and revoke the floor of ATs originating such audio.

In a further alternative example, instead of simply deciding to revoke the floor of one or more ATs at the application server 170 and then issuing the revocation-order, the application server 170 can query or prompt a superuser of the group communication session before taking such action. This alternative example merges FIG. 6C with FIG. 6B in a sense, such that the application server 170 provides recommendations to a superuser for floor-revocation, but the final authority still resides with the superuser (e.g., AT A, in FIG. 6B).

After determining to revoke AT C's non-exclusive floor in 600C, the application server 170 drops AT C's non-exclusive floor and then notifies that AT C that its floor has been revoked, 605C. AT C acknowledges the floor-revocation message in 610C. While not shown in FIG. 6C, AT C can also optionally notify its user with regard to the floor-revocation (e.g., so that the user of AT C is aware that his/her speech is no longer being sent to the group).

At this point, the application server 170 stops mixing media from input stream C into any of the output streams to ATs A . . . X, 615C. After revoking AT C's non-exclusive floor to the group communication session, it will be appreciated that ATs A and B still hold non-exclusive floors to the hybrid group communication session and continue to send media to the application server 170, as input streams A and B, respectively, for transmission to the group, 620C and 625C. Next, 630C through 640C substantially correspond to 630A through 640A of FIG. 6A, respectively and/or 645B through 655B of FIG. 6B, respectively, and as such will not be described further for the sake of brevity The group communication session described above with respect to FIGS. 5A through 6SC may correspond to a group communication session supported by IP multicasting protocols, or IP unicasting protocols. In IP multicasting, a downlink broadcast channel (BCH) carries a single multicast flow within one or more sectors to reach each 'listening' multicast group member, while a separate scheduling message (e.g., a broadcast overhead message (BOM)) is transmitted on a downlink control channel that indicates how the multicast group members can tune to the downlink BCH. In IP unicasting, each group message is transmitted to each group communication session participant, or multicast group member, as a separate unicast message addressed to each group member individually.

While embodiments have been above-described generally to audio-based group communication sessions, other embodiments can be directed to other types of group communication session, such as video conferences, etc. Also, while embodiments have been directed above to RTP packets, it will be appreciated that other embodiments of the invention can be directed to other types of media packets. For example, in a system operating in accordance with RealNetworks protocols, a RDT packet may be used instead of an RTP packet. In other words, as noted above, while embodiments have been generally been directed to an implementation in accordance with EVRC-A protocols, other Vocoders (e.g., AMR, etc.) that have a discrete frame-rate set can be used in other embodiments of the invention.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of participating in a group communication session with a communication group at an access terminal within a wireless communications system, comprising:
   receiving media at the access terminal from one or more other members of the communication group that currently hold a non-exclusive floor for the group communication session;
   receiving, from an application server that is arbitrating the group communication session, an authorization request that recommends revocation of the non-exclusive floor for at least one of the one or more other members;
   receiving input from a user of the access terminal that indicates approval of the authorization request; and
   sending, in response to the received user input, a floor-revocation request to the application server that authorizes the application server to revoke the non-exclusive floor of the at least one other member.

2. The method of claim 1 wherein the access terminal is allocated a revocation privilege over the at least one other member that permits the access terminal to prompt the application server to revoke the non-exclusive floor of the at least one other member upon request.

3. A method of supporting a group communication session with a communication group at an application server within a wireless communications system, comprising:
   granting a non-exclusive floor to a plurality of access terminals, among the communication group, that are expected to have users with an intent to speak to the communication group;
   selectively mixing media from each of the plurality of access terminals;
   selectively sending the mixed media to the communication group;
   determining to revoke the non-exclusive floor from a given access terminal among the plurality of access terminals;
   transmitting, to another access terminal in the communication group in response to the determination, a request for authority to revoke the non-exclusive floor from the given access terminal; and
   revoking the non-exclusive floor from the given access terminal based on whether the another access terminal authorizes the application server to revoke the non-exclusive floor from the given access terminal.

4. The method of claim 3, further comprising:
   receiving authorization to revoke the non-exclusive floor of the given access terminal from the another access terminal.

5. The method of claim 4, further comprising:
   in response to the received authorization, verifying that the another access terminal has authority to revoke the non-exclusive floor of the given access terminal,
   wherein the revoking is based on the another access terminal having the verified authority to revoke the non-exclusive floor of the given access terminal.

6. The method of claim 3, wherein the another access terminal corresponds to a high-priority access terminal with floor-revocation privileges.

7. An access terminal configured to participate in a group communication session with a communication group within a wireless communications system, comprising:
   means for receiving media at the access terminal from one or more other members of the communication group that currently hold a non-exclusive floor for the group communication session;
   means for receiving, from an application server that is arbitrating the group communication session, an authorization request that recommends revocation of the non-exclusive floor for at least one of the one or more other members;
   means for receiving input from a user of the access terminal that indicates approval of the authorization request; and
   means for sending, in response to the received user input, a floor-revocation request to the application server that authorizes the application server to revoke the non-exclusive floor of the at least one other member.

8. An application server configured to support a group communication session with a communication group within a wireless communications system, comprising:
   means for granting a non-exclusive floor to a plurality of access terminals, among the communication group, that are expected to have users with an intent to speak to the communication group;
   means for selectively mixing media from each of the plurality of access terminals;
   means for selectively sending the mixed media to the communication group;
   means for determining to revoke the non-exclusive floor from a given access terminal among the plurality of access terminals;
   means for transmitting, to another access terminal in the communication group in response to the determination, a request for authority to revoke the non-exclusive floor from the given access terminal; and
   means for revoking the non-exclusive floor from the given access terminal based on whether the another access terminal authorizes the application server to revoke the non-exclusive floor from the given access terminal.

9. An access terminal configured to participate in a group communication session with a communication group within a wireless communications system, comprising:
- logic configured to receive media at the access terminal from one or more other members of the communication group that currently hold a non-exclusive floor for the group communication session;
- logic configured to receive, from an application server that is arbitrating the group communication session, an authorization request that recommends revocation of the non-exclusive floor for at least one of the one or more other members;
- logic configured to receive input from a user of the access terminal that indicates approval of the authorization request; and
- logic configured to send, in response to the received user input, a floor-revocation request to the application server that authorizes the application server to revoke the non-exclusive floor of the at least one other member.

10. An application server configured to support a group communication session with a communication group within a wireless communications system, comprising:
- logic configured to grant a non-exclusive floor to a plurality of access terminals, among the communication group, that are expected to have users with an intent to speak to the communication group;
- logic configured to selectively mix media from each of the plurality of access terminals;
- logic configured to selectively send the mixed media to the communication group;
- logic configured to determine to revoke the non-exclusive floor from a given access terminal among the plurality of access terminals;
- logic configured to transmit, to another access terminal in the communication group in response to the determination, a request for authority to revoke the non-exclusive floor from the given access terminal; and
- logic configured to revoke the non-exclusive floor from the given access terminal based on whether the another access terminal authorizes the application server to revoke the non-exclusive floor from the given access terminal.

11. A non-transitory computer-readable storage medium containing instructions stored thereon, which, when executed by an access terminal configured to participate in a group communication session with a communication group within a wireless communications system, cause the access terminal to perform operations, the instructions comprising:
- program code to receive media at the access terminal from one or more other members of the communication group that currently hold a non-exclusive floor for the group communication session;
- program code to receive, from an application server that is arbitrating the group communication session, an authorization request that recommends revocation of the non-exclusive floor for at least one of the one or more other members;
- program code to receive input from a user of the access terminal that indicates approval of the authorization request; and
- program code to send, in response to the received user input, a floor-revocation request to the application server that authorizes the application server to revoke the non-exclusive floor of the at least one other member.

12. A non-transitory computer-readable storage medium containing instructions stored thereon, which, when executed by an application server configured to support a group communication session with a communication group within a wireless communications system, cause the application server to perform operations, the instructions comprising:
- program code to grant a non-exclusive floor to a plurality of access terminals, among the communication group, that are expected to have users with an intent to speak to the communication group;
- program code to selectively mix media from each of the plurality of access terminals;
- program code to selectively send the mixed media to the communication group;
- program code to determine to revoke the non-exclusive floor from a given access terminal among the plurality of access terminals;
- program code to transmit, to another access terminal in the communication group in response to the determination, a request for authority to revoke the non-exclusive floor from the given access terminal; and
- program code to revoke the non-exclusive floor from the given access terminal based on whether the another access terminal authorizes the application server to revoke the non-exclusive floor from the given access terminal.

* * * * *